Aug. 10, 1948.　　　　E. GOPNER　　　　2,446,583
REEL WINDING AND LINE DRYING DEVICE
Filed Oct. 11, 1947　　　　　　　　　　2 Sheets-Sheet 1
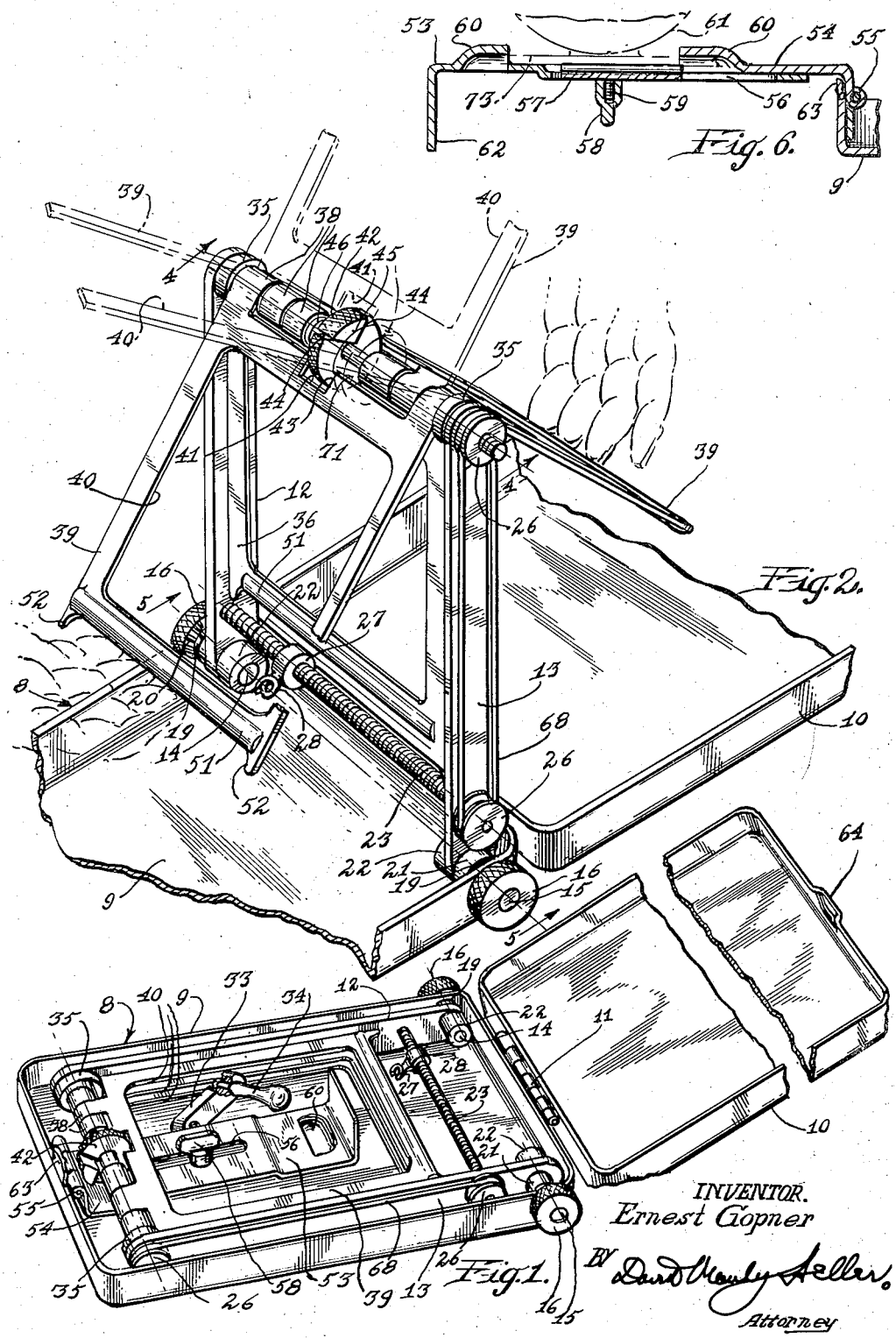
INVENTOR.
Ernest Gopner
Attorney Aug. 10, 1948.　　　　　E. GOPNER　　　　　2,446,583
REEL WINDING AND LINE DRYING DEVICE
Filed Oct. 11, 1947　　　　　　　　　　2 Sheets-Sheet 2
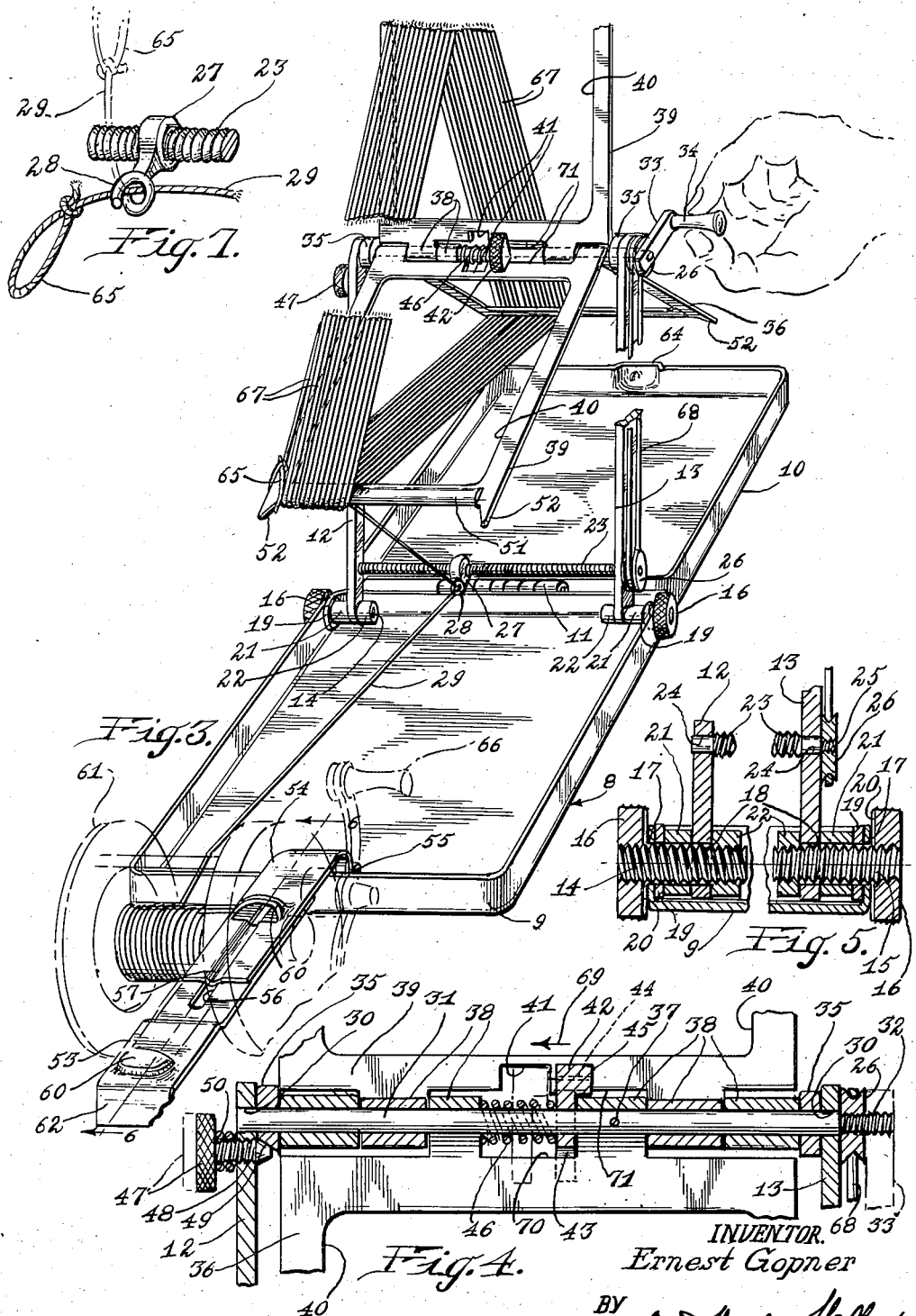
INVENTOR.
Ernest Gopner
BY
Attorney Patented Aug. 10, 1948

2,446,583

UNITED STATES PATENT OFFICE 2,446,583

REEL WINDING AND LINE DRYING DEVICE

Ernest Gopner, Elmwood Park, Ill.

Application October 11, 1947, Serial No. 779,325

4 Claims. (Cl. 242—104)

My invention relates to fishing line drying reels.

An important object of my invention is to provide a portable fishing line drying reel that may be quickly and easily collapsed into the confines of a hinged, flat carrying case, of a size that may be conveniently carried in user's pocket or in the tackle box.

A further object of my invention is to provide a fishing line drying reel which requires no fixed means of support, such as a table top or a wall, but may be opened and used anywhere.

A still further object of my invention is to provide a fishing line drying reel having reel supports, which are self-tightening in a vertical or operating position, and having a reel means consisting of a fixed blade attached to the shaft and two blades, rotatably attached to the said shaft, which are capable of being collapsed against the said fixed blade when not in use so that the said three reel blades, together with the said reel support, may be angularly rotated to a concealed position within the fishing line drying reel case.

A still further object of my invention is to provide a reel blade locking means consisting of a slotted spring-urged washer mounted on the said reel shaft and in operating position, acting to keep the three reel blades locked in equally spaced position upon the said shaft.

A still further object of my invention is to provide a reel braking means to prevent backlash from the fishing line as it is being wound.

A further object of my invention is to provide, in a fishing line drying reel, a fishing line spacing means upon the said reel consisting of a nut having an open eye which is mounted on a threaded spindle, the said spindle being rotated through belt and pulley means by the turning of the reel.

A still further object of my invention is to provide an adjustable fishing reel adapter on which may be mounted any type or size of fishing reels, and which being hinged to the said line drying reel case may be folded thereinto out of the way when not in use.

A still further object of my invention is to provide a portable fishing line drying reel, simply constructed and designed to be manufactured economically in large quantities.

Other objects and advantages inherent in my invention will be disclosed by the following description and the accompanying illustrations, in which like parts are designated by like numerals, and in which Fig. 1 is a perspective view of my invention with reel and adapter collapsed in an inoperative position in the container.

Fig. 2 is a perspective view of my invention showing the reel stand in a vertical, operative position and showing the reel blades in the act of being opened to their respective operative positions.

Fig. 3 is a perspective view of my invention in an open, operative position, and showing a fishing reel, in phantom lines, mounted thereon from which the line is being wound upon the reel.

Fig. 4 is a cross-sectional view taken substantially on line 4—4 of Fig. 2.

Fig. 5 is an enlarged cross-sectional view of a portion of my invention taken substantially on line 5—5 of Fig. 2.

Fig. 6 is a cross-sectional view of the adapter means of my invention taken substantially on line 6—6 of Fig. 3.

Fig. 7 is a perspective view of the eye nut line spacing means of my invention.

My invention is generally designated 8 and consists of a stream-lined rustproof metal case 9, preferably of aluminum or like material, of a fairly heavy gauge.

The case 9 is provided with a mating cover 10, hinged at 11 by piano-type hinge to the case 9. A reel stand consisting of reel supports 12 and 13 are mounted by means of end holes 18 on stud bolts 14 and 15 located in holes 17 at the hinged end of case 9. Stud bolt 14 is provided with a right-hand thread, and stud bolt 15 is provided with a left-hand thread. The said stud bolts 14 and 15 are held in position by knurled nuts 16 on the outside of the case 9. The said knurled nuts 16 being roughened on their inner surfaces, as indicated at 20 in Fig. 5, to prevent their being turned as the supports 12 and 13 are articulated to a vertical operating position, or a horizontal inoperative position, as shown in Figs. 1 and 2 respectively.

The said supports 12 and 13 are positioned on the inside of the case 9 by spacers 21 on the stud bolts 14 and 15 to provide clearance within the case 9 for the said reels when it is collapsed. Lock washers 19 and lock nuts 22 hold the said supports 12 and 13 securely in place upon the stud bolts 14 and 15. A threaded spindle 23 is rotatably mounted in aligned holes 24 in the supports 12 and 13 at a point just above the stud bolt mounting means 14 and 15. A pulley 26 is secured to the reduced threaded end 25 of the spindle 23 outside the support 13. A nut 27, on the spindle 23, has attached thereto a segment of coiled wire 28 forming an eye, through which is looped the fishing line 29, as best illustrated in Fig. 7.

A shaft 31 is journaled in holes 30 in the outer ends of the supports 12 and 13, and a second pulley 26 is mounted upon its reduced threaded end 32. Two pulleys 26 are connected by a belt 68, preferably a rubber band. Also mounted upon the reduced threaded ends 32 is a crank means 33, the handle 34 rotatably mounted upon the said crank 33. A reel blade 36, having bearings 38 formed of peened over tabs, is fixably mounted on the shaft 31 by a pin 37, or other suitable means. Two more reel blades 39 of the same size as reel blade 36 are rotatably mounted upon the shaft 31 by their bearings 38. The reel blades 36 and 39 are positioned from the supports 12 and 13 by spacers 35; said reel blades 36 and 39 are provided with lightening cutouts 40 and the two reel blades 39 are also provided on their inner edges with small cutouts 41 to provide clearance for a knurled edged washer 42 mounted upon the shaft 31. The said washer 42 is slidably mounted upon the shaft 31 between the two bearings 38 of the reel blade 36 and is slidably connected to the said reel blade 36 by a slot 43 therein, engaging a lip 70 on the inner edge of blade 36.

A segment 45 of greater thickness is formed on the opposite side of the slot 43 on the said washer 42 to act as a locating stop for the positioning of blades 39 in equidistant relationship. Slots 44, one on either side of the segment 45, provide locking means for engaging the lips 71 of the two reel blades 39 when the washer 42 is in a locking or operative position, as shown in solid lines in Figs. 3 and 4. The washer 42 is held in its locking position by a coil spring 46 against the bearing 38 on shaft 31. To disengage the washer 42 from its locking position, as shown in solid lines in Figs. 3 and 4, it is pushed in the direction of arrow 69 against spring 46 to the position shown in phantom lines in Fig. 4. In this position, the clearance cutout 41 of the blades 39 will allow the said blades to be rotated freely upon shaft 31 so that they may be collapsed to a juxtaposition with the blade 36 when it is desirable to collapse the reel and its support.

A reel braking means consists of a knurled head pointed end screw 47 mounted in the support 12 just below the shaft 31, in a tapped hole 48 therein. The pointed end of the screw 47 may be tightened into a tapered hole 49 in the spacer 35, which will cause a binding or braking action upon the turning of the shaft 31. A coiled spring 50 acts as a frictional lock to the screw 47.

As an attachment means for the fishing reel 61, I provide an adapter 53 which is adjustably attached to a hinge 54 attached to case 9 at 55. The adapter 53 is adjustably secured to hinge 54 by a wing nut 58 on a screw 59 attached to a depression 57 on the hinge 54 and extending through a slot 56 in the adapter 53. The depression 57 operates within the slot 56 as a key. The aligning sockets 60 are formed: one in the adapter 53, and one in the hinge 54, as mounting means for the said fisherman's reel 61 by virtue of its extension 73, as shown in Figs. 3 and 6. The end of the adapter 53 may be bent, as at 62, for leveling purposes. The said adapter 53 will, by means of its hinge 54, fold into the case 9 when not in use, as shown in Fig. 1.

A center punched tab 63 in the outer end of case 9, together with an offset portion 64 in the hinge cover, provide a simple and easily manipulated locking means for keeping said case 9 closed when being transported.

To use my fishing line drying reel, the case 9 is opened, as shown in Fig. 1. The supports 12 and 13 are raised to a vertical position, as shown in Fig. 2, in which position they are maintained by the tightening of the oppositely threaded stud bolts and nuts 14, 15, and 16, on which the said supports 12 and 13 are mounted. In this vertical position of the supports 12 and 13, the three reel blades 36 and 39 will be in a collapsed position, as shown in Fig. 1. By grasping the edges of the two rotatable reel blades 39 by the finger tips, they may be raised angularly to a spaced position from the fixed blades 36, as shown in Figs. 2 and 3. As the reel blades 39 are brought into the position shown, in phantom lines in Fig. 2, the washer 42 will by means of the slots 44 therein move to a locking position, as previously described and as illustrated in Fig. 4, holding the said blades 39 equally spaced in a locked position from the fixed reel blade 36.

The fishing reel 61 is mounted upon the adapter 53, and the line 29 is threaded into the eye 28 of the eye nut 27. The looped end 65 of the said fishing line 29 is tightened over one of the projecting ends 52 with which the outer edges of the reel blades 36 and 39 are provided. By turning the crank 33, which is mounted upon the reduced threaded end 32 of the reel shaft 31, the said fishing line 29 will be wound in the spaced arrangement 67, as shown in Fig. 3 upon the said drying reel. The spaced arrangement of the strands 67 is being controlled by the eye nut 27, as it is moved to the left by the rotating threaded spindle 23. The three blades of the fishing line drying reel are constructed wide enough to contain over their rounded edges 51 and between their projecting ears 52, in evenly spaced strands 67, the entire length of the line 29 of an average fishing reel without overlapping, thereby enhancing the drying of the said fishing line 29, the lightening cutouts 40 in the said blades 36 and 39 allowing a free passage of air currents therethrough. The fishing line 29 is rewound upon the fishing reel 61 by turning the handle 66 which causes the strands 67 to be unwound from the fishing line drying reel.

By loosening wing nut 58, reel 61 may be removed from the adapter 53 which may be swung to its inoperative position within the case 9. By pressure upon washer 42 against the spring 46, the reel blades 39 are released from their locked position and may be rotated to a juxtaposition with the fixed blade 36. Pressure upon the fishing line drying reel will cause it to rotate angularly in an arc of 90° to an inoperative, horizontal position within the case 9, as shown in Fig. 1. The oppositely threaded stud bolts 14 and 15, in turning with the supports 12 and 13, slightly loosens the binding effect of the lock washers 19 against the sides of the case 9 to allow this operation to be performed. The crank 33 having been unscrewed from the threaded end 32 to which it was attached is placed in the case 9 which may be closed and latched by the latching means 63 and 64, as previously described.

The case is of a size that it may be easily transported in a coat pocket or a tackle box. The roughened inner edges 20 of the knurled nuts 16, which are on the outside of the case 9, will prevent their becoming loosened and dropping off at any time.

Although I have shown and described a preferred embodiment of my invention, it is to be understood that I do not limit myself to the precise construction herein disclosed, and the right is reserved to all changes and modifications coming within the spirit and scope of my invention as defined in the appended claims.

Having thus disclosed and revealed my invention, what I claim as new, and desire to secure by Letters Patent, is:

1. A fishing line drying reel comprising, a case, a cover hingedly secured thereto, reel supports articulately secured adjacent the hinged section of said case, collapsible winding reel means rotatably secured to the free ends of the said reel supports, threaded spindle means rotatably secured to the said reel supports, pulley means provided on the said winding reel means and the said threaded spindle means, belt means interconnecting the said pulley means, eye nut means threadably engaging the said threaded spindle means, fishing reel adapter means hingedly secured to the free end of said case, and crank handle means removably secured to the said winding reel means, the said fishing reel adapter means including two slidably connected elements, each of said elements being provided with sockets, and screw means for locking the said slidably connected elements in fixed adjustment.

2. A fishing line drying reel comprising, a case, a cover hingedly secured thereto, reel supports articulately secured adjacent the hinged section of said case, collapsible winding reel means rotatably secured to the free ends of the said reel supports, threaded spindle means rotatably secured to the said reel supports, pulley means provided on the said winding reel means and the said threaded spindle means, belt means interconnecting the said pulley means, eye nut means threadably engaging the said threaded spindle means, fishing reel adapter means hingedly secured to the free end of said case, crank handle means removably secured to the said winding reel means, and articulate means limiting the movement of the said reel supports to substantially 90° simultaneously effectuating a tightening action in operative position and a loosening action in inoperative position, the said fishing reel adapter means including two slidably connected elements, each of said elements being provided with sockets, and screw means for locking the said slidably connected elements in fixed adjustment.

3. A fishing line drying reel comprising, a case, a cover hingedly secured thereto, reel supports articulately secured adjacent the hinged section of said case, collapsible winding reel means rotatably secured to the free ends of the said reel supports, threaded spindle means rotatably secured to the said reel supports, pulley means provided on the said winding reel means and the said threaded spindle means, belt means interconnecting the said pulley means, eye nut means threadably engaging the said threaded spindle means, fishing reel adapter means hingedly secured to the free end of said case, crank handle means removably secured to the said winding reel means, and winding reel brake means secured to the free end of one of said reel supports, the said fishing reel adapter means including two slidably connected elements, each of said elements being provided with sockets, and screw means for locking the said slidably connected elements in fixed adjustment.

4. A fishing line drying reel comprising, a case, a cover hingedly secured thereto, reel supports articulately secured adjacent the hinged section of said case, collapsible winding reel means rotatably secured to the free ends of the said reel supports, threaded spindle means rotatably secured to the said reel supports, pulley means provided on the said winding reel means and the said threaded spindle means, belt means interconnecting the said pulley means, eye nut means threadably engaging the said threaded spindle means, fishing reel adapter means hingedly secured to the free end of said case, crank handle means removably secured to the said winding reel means, articulate means limiting the movement of the said reel supports to substantially 90° simultaneously effectuating a tightening action in operative position and a loosening action in inoperative position, and winding reel brake means secured to the free end of one of said reel supports, the said fishing reel adapter means including two slidably connected elements, each of said elements being provided with sockets, and screw means for locking the said slidably connected elements in fixed adjustment.

ERNEST GOPNER.

REFERENCES CITED

The following references are of record in the file of this patent:

UNITED STATES PATENTS

| Number | Name | Date |
| --- | --- | --- |
| 132,155 | Hayes | Oct. 15, 1872 |
| 967,734 | Darrow | Aug. 16, 1910 |
| 1,018,550 | Brearey | Feb. 27, 1912 |
| 1,043,397 | Capell | Nov. 5, 1912 |
| 1,310,816 | Weiss | July 22, 1919 |
| 1,710,337 | Beach | Apr. 23, 1929 |
| 2,040,567 | Rowen | May 12, 1936 |
| 2,282,147 | Quentin et al. | May 5, 1942 |